Jan. 2, 1923.
G. B. BRITTON.
PROCESS AND APPARATUS FOR TREATING RUBBER.
FILED JULY 12, 1920.
1,440,371
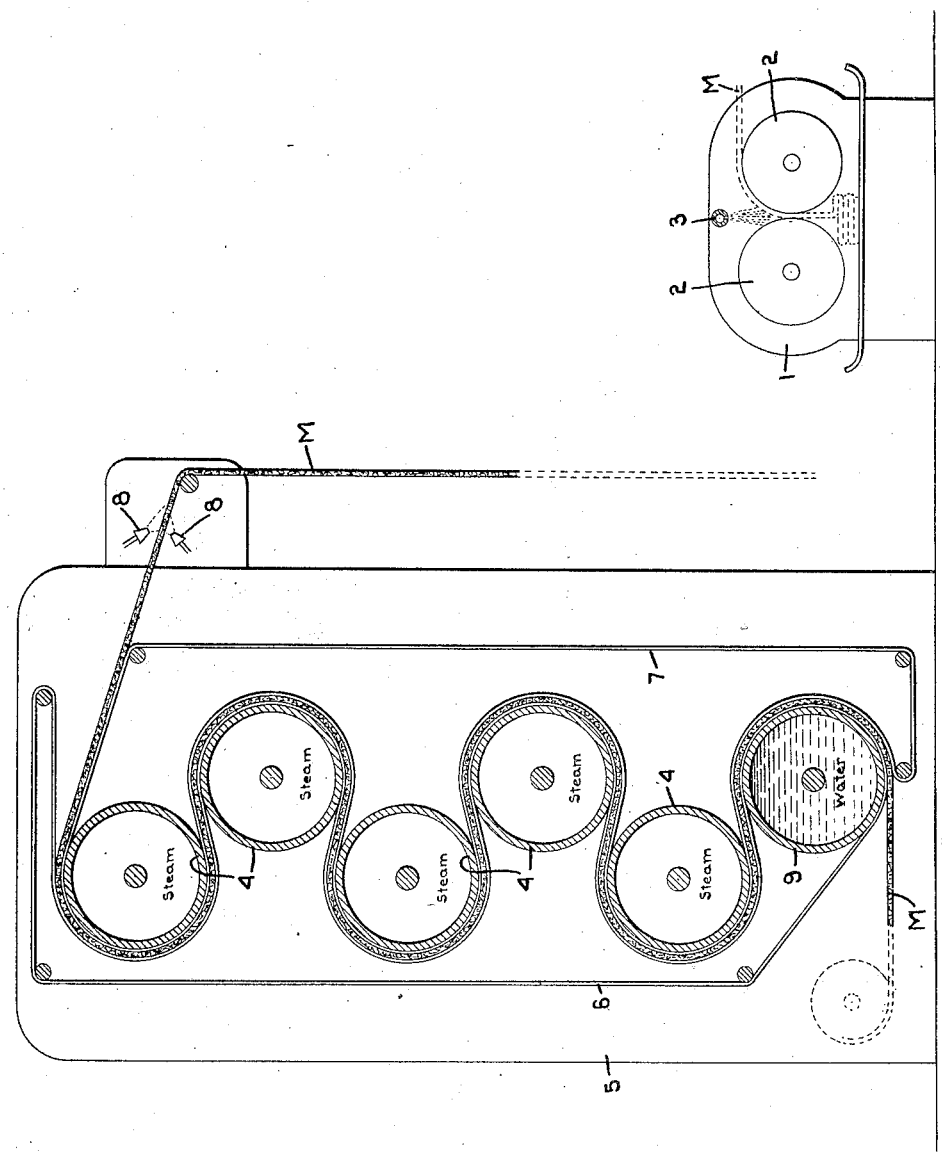
INVENTOR
Glenn B. Britton
BY
ATTORNEY Patented Jan. 2, 1923.

1,440,371

UNITED STATES PATENT OFFICE.

GLENN B. BRITTON, OF AKRON, OHIO, ASSIGNOR TO THE FIRESTONE TIRE AND RUBBER COMPANY, OF AKRON, OHIO, A CORPORATION OF OHIO.

PROCESS AND APPARATUS FOR TREATING RUBBER.

Application filed July 12, 1920. Serial No. 395,470.

*To all whom it may concern:*

Be it known that I, GLENN B. BRITTON, a citizen of the United States, residing at Akron, in the county of Summit and State of Ohio, have invented certain new and useful Improvements in Processes and Apparatus for Treating Rubber, of which the following is a specification.

This invention relates to an apparatus for use in the process of rubber manufacture and is particularly, though not exclusively, designed to dry the sheets of raw rubber as they come from the washing machines.

The object of this invention is to devise a means by which moist or wet sheets of rubber may be dried and prepared in a much less time than required at present. Heretofore, the sheets of rubber have been hung up in heated chambers until properly dried and aged, it taking from about thirty hours to one week to thoroughly dry and age the material. With my improved method the rubber is treated in a small fraction of the time formerly required while obtaining the same results.

My invention provides an apparatus that requires very little floor space. Also one in which material may be fed in a continuous strip if desired. It contemplates the use of the drying apparatus in connection with a series of washing machines to produce a continuous apparatus for severally washing and drying strips of material of great length.

The above and other objects of this invention will more fully appear from the following description, and will be especially pointed out in the claims.

The single figure is a diagrammatic view of one form of machine that may be used to accomplish the purpose of this invention. It shows the drying apparatus adjacent the washing machines, to eliminate unnecessary handling of the material.

The rubber M is first thoroughly cleansed in the washing machine 1 by passing it between a pair of squeeze rollers 2 under a stream of water supplied from a spray pipe 3, this being the ordinary well-known type of washing machine. From the washers the wet sheeted rubber is taken or fed directly to the drying apparatus.

In drying the stock, in this selected embodiment of this invention, it is first subjected to air blasts from the nozzle 8, which serve to remove the surface moisture. The rubber as received from the washing machines is in a crinkly, rugose sheet, having numerous crevices and small apertures in its surface in which is retained a considerable amount of the water received in the washing machine. The air blast playing on both sides of the sheet blows out most of the water from the depressions.

The sheet of rubber is then fed into the drying apparatus between a pair of flexible belts 6 and 7. The belts 6 and 7 may be made of any suitable material, but are preferably porous so that moisture may escape through the belts. They convey the material over a plurality of heated drums 4, revolubly secured in a framework 5 and also confine the rubber against undue expansion or bubbling, as is likely to occur when applying heat to rubber containing moisture, and due to the high humidity conditions between the belts, the rubber is dried rapidly without injury.

At the outlet end of the machine is located a water cooled roller 9, over which the stock passes. The stock in passing over the heated rolls 4 consumes a considerable amount of heat and has to be cooled before winding up or storing to prevent deterioration that would follow if the material was let stand at a high temperature.

Any suitable windup or receiving platform may be used to receive the sheet of rubber as it comes from the apparatus.

It will be obvious that the means for heating the material may, as illustrated, be a plurality of heated revoluble drums, or other means capable of receiving and heating the material may be utilized. It is also possible to carry out the drying under any condition of pressure or varying pressures from pressure below to above atmospheric pressure, as will be understood by those familiar with the art of drying rubber.

The foregoing description has been given for clearness of understanding only and no unnecessary limitations should be understood therefrom.

I claim:

1. The process of treating rubber comprising forming the rubber into sheets, subjecting the rubber to water while it is being formed into the sheets, and passing the sheets over a heated surface to dry the rubber.

2. The process of treating rubber comprising forming the rubber into a sheet and subjecting it to the action of a spray of water and drying the sheet by passing it over a plurality of heated rolls.

3. The process of treating rubber comprising forming the rubber into a sheet by passing it between a pair of rollers, subjecting the rubber to a spray of water as it passes between said rollers, and then passing said rubber sheet over a plurality of heated surfaces to dry same.

4. The process of treating rubber, comprising forming the rubber into a sheet by passing it between a pair of rollers, subjecting the rubber to a spray of water as it passes between the rollers to wash same, and then confining said rubber between two moving surfaces and simultaneously heating the same to remove the moisture therefrom.

5. The process of treating rubber, comprising forming the rubber into a sheet and washing the same, and then passing the rubber over a heated surface to remove the moisture therefrom.

6. The process of treating rubber, comprising forming the rubber into a sheet and washing the same, and then passing the sheet of rubber over a plurality of heated surfaces in a continuous movement.

7. The process of treating rubber, comprising forming the rubber into a sheet and washing the same, then passing the sheet of rubber through a drying apparatus and simultaneously confining the rubber to prevent the formation of blisters in the rubber sheet.

8. The process of treating rubber, comprising forming the rubber into a sheet and washing the same, then passing the sheet of rubber in continuous travel through a drying device and simultaneously confining the rubber between porous surfaces to prevent the formation of blisters in the rubber sheet.

9. The process of treating rubber, comprising forming the rubber into a sheet and washing the same, then passing the rubber sheet around a series of heated rollers of sufficient number to dry the rubber sheet and immediately chilling the dried sheet.

10. The process of treating rubber, comprising forming the rubber into a sheet and washing the same, then subjecting the rubber sheet to a drying device while it is moved in a continuous length.

11. The process of treating rubber, comprising forming the rubber into a sheet and simultaneously washing the same, then subjecting the rubber sheet to a heated drying device while it is moved in a continuous length and immediately chilling the rubber sheet.

12. The process of treating rubber, comprising forming the rubber into a sheet, simultaneously washing the sheet, removing the surface water from the sheet, and then completely drying the sheet by passing it through a heated drying apparatus in a continuous length.

13. The process of treating rubber, comprising forming the rubber into a sheet, simultaneously washing the sheet, then removing the surface water from the sheet, finishing the drying of the sheet by passing it over a plurality of heated surfaces.

14. The process of treating rubber, comprising forming the rubber into a sheet, simultaneously washing the sheet, then removing the surface water from the sheet, finishing the drying of the sheet by passing it over a plurality of heated surfaces and confining the rubber while it is moved to prevent the formation of bubbles or blisters therein.

15. The process of treating rubber, comprising forming the rubber into a sheet, simultaneously washing the sheet, then removing the surface water from the sheet, finishing the drying of the sheet by passing it over a heated element, confining the rubber as it is moved to prevent the formation of bubbles or blisters therein, and chilling the rubber sheet as it leaves the heated element.

16. An apparatus for drying rubber, comprising a framework, a plurality of heated revoluble drums carried by said framework, a chilled drum subsequent to said heated drums, and means for conveying the material over said drums.

GLENN B. BRITTON.